Nov. 17, 1953 A. L. SELJOS 2,659,575
LIVE LINE LOAD WEIGHT INDICATOR ASSEMBLY
Filed Oct. 20, 1952 3 Sheets-Sheet 1

INVENTOR.
Arthur L. Seljos
BY
ATTORNEY

Nov. 17, 1953    A. L. SELJOS    2,659,575
LIVE LINE LOAD WEIGHT INDICATOR ASSEMBLY
Filed Oct. 20, 1952    3 Sheets-Sheet 2

INVENTOR.
Arthur L. Seljos,
BY
ATTORNEY

Nov. 17, 1953　　　A. L. SELJOS　　　2,659,575
LIVE LINE LOAD WEIGHT INDICATOR ASSEMBLY
Filed Oct. 20, 1952　　　3 Sheets-Sheet 3
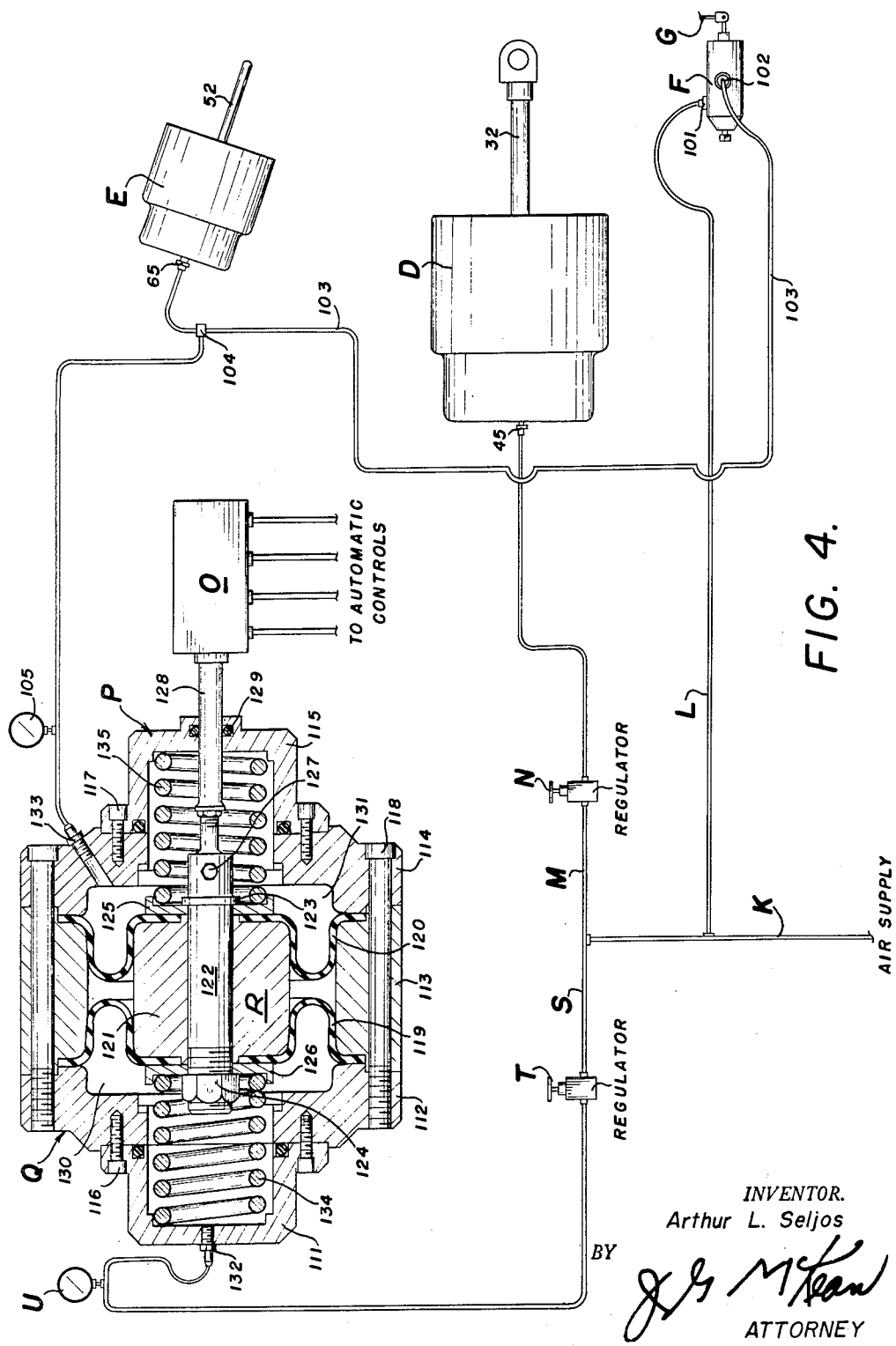
FIG. 4.
*INVENTOR.*
Arthur L. Seljos
BY
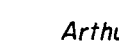
ATTORNEY

Patented Nov. 17, 1953

2,659,575

UNITED STATES PATENT OFFICE 2,659,575

LIVE LINE LOAD WEIGHT INDICATOR
ASSEMBLY

Arthur L. Seljos, Houston, Tex., assignor, by mesne assignments, to Standard Oil Development Company, Elizabeth, N. J., a corporation of Delaware Application October 20, 1952, Serial No. 315,766

4 Claims. (Cl. 254—173)

This application is directed to a live line weight indicator assembly particularly adapted to be attached to the live line of an oil well drilling rig and is an improvement over the weight indicator assembly described and claimed in copending patent application Serial No. 281,429 filed in the name of Robert R. Crookston on April 9, 1952.

An object of the invention is to provide a weight indicator for a drilling rig of such design and construction as to be able to withstand the full weight of a string of drill pipe suspended from the drilling line and yet be sensitive enough to indicate with considerable accuracy the changes in the weight of the drill stem carried on the drilling bit as the drilling operation proceeds.

The assembly of the present application may be characterized as a differential weight indicator assembly inasmuch as it is arranged so that one power means carries the major portion of the load, say 80 or 90% of the load, while the other power means, which also indicates variations in weight, carries the balance of the load. Since the load indicating portion carries only a small amount of the load, such as 10 or 20% of the total load, it is possible for it to be considerably more sensitive than in prior devices where the weight indicating means was required to carry the entire load.

Other objects and advantages of the present invention may be seen from the following description taken with the drawing in which Fig. 1 is an elevation, partly in section, showing details of construction of the assembly;

Fig. 4 is a schematic view similar to Fig. 3 but showing a way the device may be connected to control means adapted for automatically controlling the brakes of a drilling rig.

Figure 1:
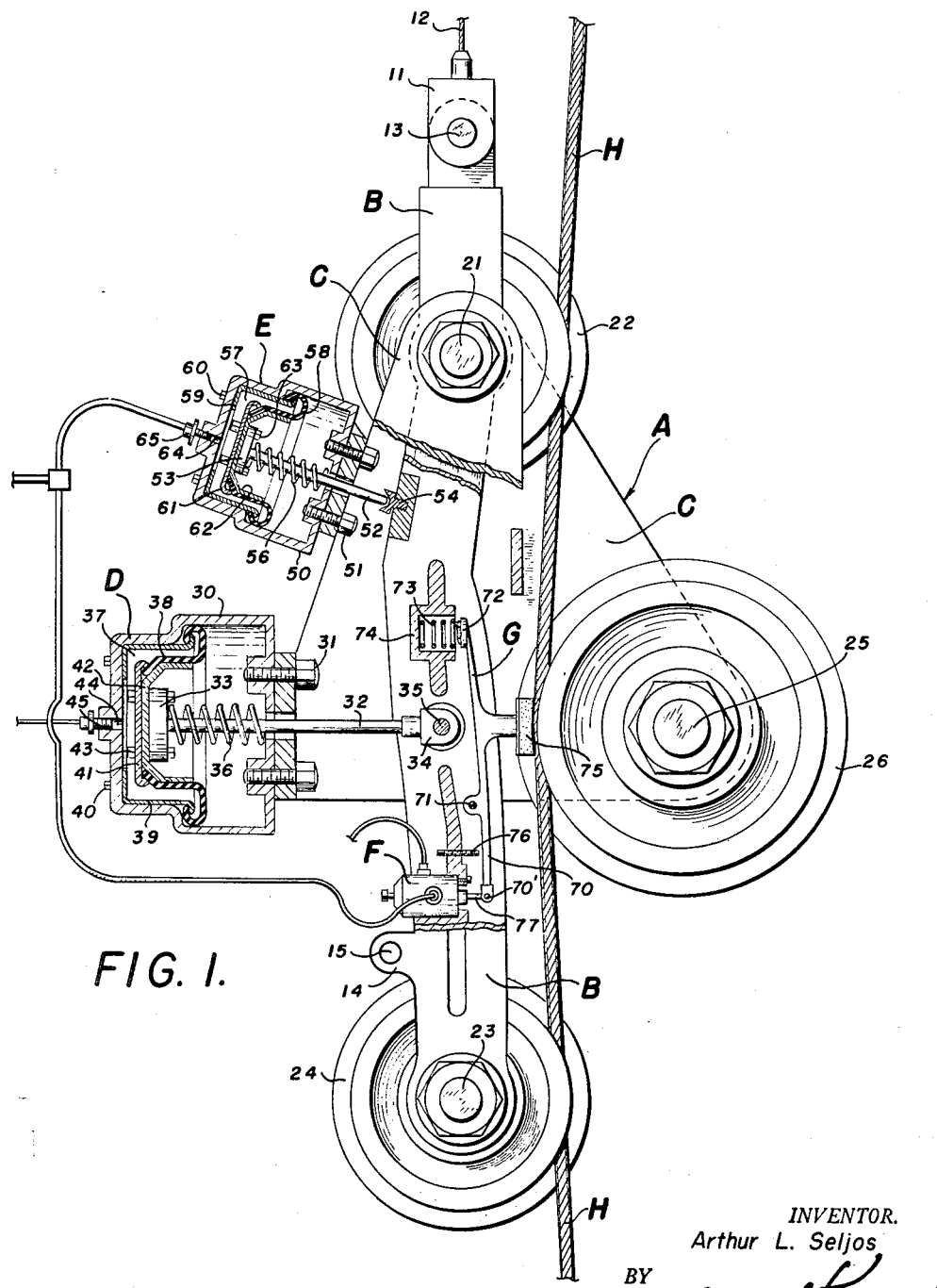

The invention will now be described in greater detail in conjunction with the drawing.

Turning now specifically to the drawing, Fig. 1 shows an embodiment of the clamp assembly as engaged with a load carrying line. By way of example, the line may be that part of the drilling line passing between the drawworks or hoisting drum of the drilling rig and the crown block of the derrick.

The complete clamp assembly is designated as A and has as its principal parts or sub-assemblies a frame member B, a frame member C, a large fluid motor assembly D, a smaller fluid motor assembly E, a valve assembly F and a valve actuating assembly G. The clamp assembly A is engaged with a live portion of line H so that the line moves longitudinally through the assembly A as it is reeled on and unreeled from the drawworks.

It will be found desirable to provide a means for hanging the assembly A in a derrick and also to provide a mechanism for moving it laterally in the derrick. In the drawing a clevis 11 attached to the lower end of a line 12 and attached to member B by pin 13 is shown as a suspending means. The lower end of the frame is in the form of a yoke 14 provided with a hole 15 for receiving a pin to which a suitable positioning means may be attached. Details of construction of suitable means for suspending a device in a derrick and for moving it laterally is shown in the aforementioned patent application Serial No. 281,429.

It has heretofore been explained that the advantage of the device is that two motor means are provided, a larger one for supporting the major portion of the load and a minor portion of the load and indicating changes in weight. These two fluid motors are D and E in the embodiment shown. It is preferred that D be arranged to carry from 80 to 90% of the load and E carries the remainder, that is from 10 to 20% of the load. Thus, in dimensions D should be at least some multiple of the smaller motor E; for example, the pressure subject area of D against which compressed air is impressed may be from 3 to 5 times the corresponding pressure subject area of E.

In assembly A member 21 serves as a pivot securing the upper ends of frame members B and C together. Member 11 also serves as an axle upon which grooved follower wheel 22 is mounted. Another axle member 23 is secured to the lower end of frame member B and serves as the mounting means for grooved follower wheel 24. Another axle member 25 is secured to frame member C and serves as the mounting means for grooved follower wheel 26. It will be understood that the several axles will be provided with suitable bearings to allow free angular movement between frame members B and C and free rotation of the grooved follower wheels 22, 24, and 26 but since bearing assemblies are well known to the art they have not been shown in the drawing.

As seen in the drawing, live line H is threaded between the grooved follower wheels with one side of the line in contact with grooved follower wheels 22 and 24 and the other side of the line in contact with grooved follower wheel 26. The grooved follower wheel 26 is positioned between grooved follower wheels 22 and 24 and when force is exerted by means of either or both of assemblies D and E the grooved follower wheel 26 forces the line to form a kink, bend or bight between the spaced grooved follower wheels 22 and 24.

The power means for moving the frame members B and C whereby the grooved follower wheels 22, 24, and 26 are engaged with the line or whereby they may be disengaged and released from the line are the large fluid motor assembly D and the smaller fluid motor assembly E. Fluid motor assemblies are well known to the art, and it will be understood that any suitable assemblies may be used. However, details of specific embodiments are shown in Fig. 1.

Assembly D consists of a body or casing 30 with the interior hollow and of a general cylindrical shape. Body 30 is secured to frame member C by cap screws 31. A piston rod 32, as seen in Fig. 1, has its left end terminating in a head 33 which is within body 30. The right end of piston rod 32 terminates in a yoke 34 which is pivotally secured to body member B by an axle 35. A spring 36 within body 30 encircles piston rod 32 with one end in contact with head 33 thereof and the other end in contact with the wall of body 30, thereby biasing piston rod head 33 to the left. During the time that power fluid is not being supplied to the assembly D, spring 36 exerts a bias to pull grooved follower wheel 24 away from grooved follower wheel 26, thereby releasing the assembly A from wire line H.

As seen in Fig. 1, the left end of body 30 is formed into a chamber 37 by means of a diaphragm 38. The outer edge of diaphragm 38 is clamped to chamber 30 in an air-tight manner by means of ring member 39 secured to body 30 by cap screws 40. The inside edge of diaphragm 38 is clamped air-tight by being bolted between retaining members 41 and 42, which members are fastened together to the piston rod head by bolts 43. The left end of body 30 has an opening 44 to which is secured a compressed air fitting 45.

Assembly E consists of a body or casing 50, the interior of which is hollow and is of a generally cylindrical shape. Body 50 is secured to frame member C by cap screws 51. A piston rod 52, as seen in Fig. 1, has its left end terminating in a head 53 which is within body 50. The right end of piston rod 52 is rounded and fits into a corresponding cavity in the head of screw 54 mounted on body member B. A spring 56 within body 50 encircles piston rod 52 with one end in contact with a wall of body 50 and the other end in contact with piston rod head 53; thereby biasing the piston rod head to the left.

As seen in Fig. 1, the left end of body 50 is formed into a chamber 57 by means of a diaphragm 58. The outer edge of diaphragm 58 is secured to chamber 50 in an air-tight manner by means of ring member 59 which is secured to body 50 by cap screws 60. The inside edge of diaphragm 58 is clamped air-tight by the retaining members 61 and 62, which members are fastened together and to the piston rod head by bolts 63. The left end of body 50 has an opening 64 to which is secured a compressed air fitting 65.

Considering both the assemblies D and E together, it will be seen that the admission of compressed air into chamber 37 has the effect of forcing piston head 33 to the right and similarly the admission of compressed air to chamber 57 has the effect of forcing piston head 53 to the right. The bias exerted by each of the assemblies tends to move grooved follower wheel 26 to the left and grooved follower wheels 22 and 24 to the right, thereby putting a kink or bight in live line H. In order to achieve this effect, the power fluid in chamber 37 must, of course, overcome the bias exerted by spring 36 and the power fluid in chamber 57 must overcome the bias exerted by spring 56. This is in addition to overcoming the tension in line H.

The valve actuating assembly G consists of an elongated member 70 which is pivoted to frame member B by means of a pivot 71 which is secured to the frame member and which passes through a suitable opening in member 70. The upper end of member 70 is formed in the shape of a boss 72 for engagement with the end of spring 73, said spring fitting in a spring receiving receiver 74 of frame member B. Thus, spring 73 exerts a bias on the upper end of 72 of member 70 in a clockwise direction about pivot 71 as seen in Fig. 1. A shoe 75 for contacting the live line H is secured to member 70 at a point between its upper end and pivot 71. When either or both fluid motor assemblies D and E exert a force moving grooved follower wheel 26 to the left and a grooved follower wheel to the right, contact of the live line H with shoe 75 has the effect of overcoming the bias exerted by spring 73 and causing member 70 to pivot in counterclockwise direction about pivot 71. An adjustable stop member 76 is secured to frame member B and is arranged to contact member 70 at a point between pivot 71 and the lower end of member 70, thereby limiting the amount of movement of member 70 in the clockwise direction around pivot 71. Such a limit in the movement of member 70 is necessary when the device is released from the live line H. The lower end of member 70 is secured by a pin 70' to actuating member 77 of valve assembly F.

Figure 2:
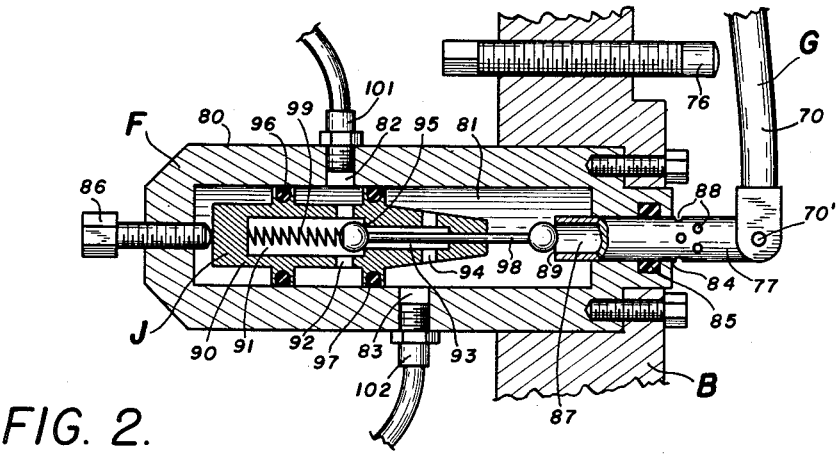
Fig. 2 is a view, partly in section, of a portion of the clamp assembly shown in Fig. 1.

The details of construction of valve assembly F are shown in Fig. 2. Valve body 80 has a central chamber 81 with an inlet port 82 to which is attached fitting 101 and a delivery port 83 to which is attached fitting 102. The right end of valve body 80, as seen in Fig. 2, has an end passage 84 in which member 77 fits slidingly and is sealed by means of a sealing ring 85. The left end of valve body 80 is provided with an adjusting screw 86.

Member 77 has its right end pivoted to valve operating member 70 as heretofore described. A central passage 87 extends from the left end of member 77 to side outlet ports 88, said outlet ports being always to the right of sealing ring 85. The left end of member 77 is in the shape of an annular valve seat 89. Within valve body 80 is an assembly J consisting of a body 90 having a cavity 91 with inlet ports 92 discharging thereto and having communicating therewith an axially extending passage 93. Passage 93 communicates with side ports 94 whereby fluid may be discharged therethrough. Valve body 90 has a valve seat 95 where cavity 91 joins passage 93. O-rings 96 and 97 are arranged on the outside of body 90 and seal the space between bodies 80 and 90 around the inlet port 82 of valve body 80. A dumb-bell shaped valve member 98 is carried by valve body 90. The central portion of valve member 98 moves slidably in passage 93; the left end thereof being adapted to seat on valve seat 95 and the right end thereof being adapted to seat on valve seat 89 of member 77. A spring 99 is arranged within body 90 and biases valve member 98 to the right.

Figure 3:
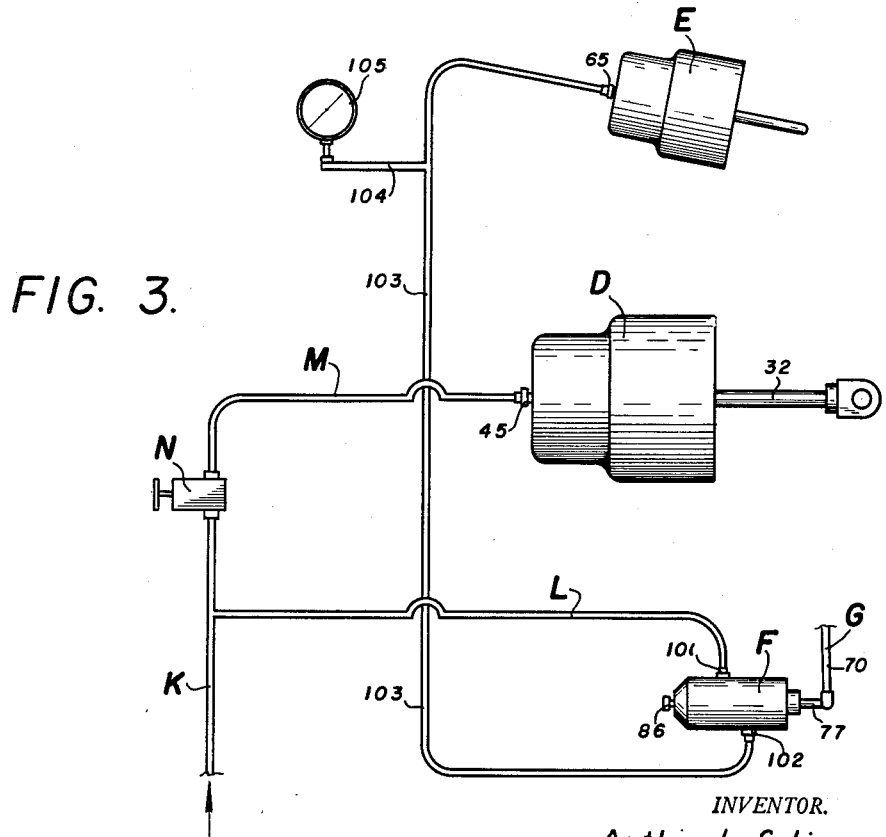
Fig. 3 is a schematic view showing air flow lines connected to several parts of the assembly shown in Fig. 1.

Air lines for controlling the assembly are shown in Fig. 3. A compressed air supply line K from a substantially constant pressure air supply such as an air compressor, not shown in the drawing, has branches L and M. Branch L is connected with inlet port fitting 101 of valve assembly F. The other branch M which has arranged therein a hand set air regulator N is connected to compressed air fitting 45 of fluid motor assembly D. Compressed air fitting 102 of delivery port 83 of valve assembly F is connected through line 103 to a branched manifold 104, one end of which is connected to compressed air fitting 65 of fluid motor assembly E and the other branch of which is connected to gauge 105.

It will be seen that when the device is in operation, valve F has its inlet port 82 continuously connected with a supply of compressed air. With regard to movements of parts of assembly A which in turn causes movement of actuating assembly G and actuation of valve F, it will be seen that when member 77 is moved to the right to bring seat 89 out of contact with valve member 98 that air can bleed to the atmosphere from cavity 81 of valve body 80 (and from delivery port 83) by means of central passage 87 and outlet ports 88 of member 77. As member 77 is moved to the left, it first brings seat 89 into contact with the right end of valve member 98. At this position, with the left of valve member 98 remaining seated on its seat 95, the valve is sealed off so that it does not bleed air from delivery port 83 nor does it allow air to enter through inlet port 82. Upon further movement of member 77 to the left, valve member 98 is moved to the left out of contact with its seat 95 and in this position air can pass from inlet port 82 through port 92, cavity 91, passage 93, outlet port 94 and to delivery port 83. It will be evident to a workman skilled in the art that the valve assembly F, as actuated by valve actuating assembly G, alters the amount of compressed air supplied to the smaller fluid motor assembly E as a function of the position of shoe 75 which in turn is actuated by wire line H.

In using the weight indicating device of the present application to indicate the weight carried on the drill bit in drilling a borehole, it is preferred to adjust it in the following manner. It is assumed that a string of drill pipe has been run into the borehole and the operator is ready to start drilling. Now if all the weight of the drill pipe is taken by the drilling line, as the operator may make sure by raising the bit off the bottom of the hole, then the operator adjusts air regulator N until the reading of gauge 105 is exactly zero. When the total weight on bit gauge 105 reads zero this means that the full line pressure from line K is being passed through valve F and being applied to small power means E and that the amount of additional power which is required to assist power means E to support the full weight of the drill pipe is applied by compressed air passing through the hand regulated air regulator N to the larger power means D. That is to say, small power means E is exerting the maximum amount of force it can exert at the pressure of compressed air supplied while the larger power means D is supplying the balance required. Now as the driller lowers the drill stem so that the bit rests on the bottom and a part of the weight of the drill pipe is being supported by the drill bit this means that a lesser amount of force need be supplied to assembly A in order to kink the drilling line the same amount as in the first instance when the total weight of the bit was being supported. This lesser force is obtained by the actuation of valve F which reduces the pressure of the compressed air being supplied to smaller power means E, and this reduction in pressure, and hence the weight carried on the drill bit, is indicated by the pressure gauge 105.

The weight indicating means of the present invention is particularly adapted for actuating an automatic controlling means for a drilling rig for the type disclosed in U. S. Patents 1,837,439, Brantley, November 10, 1931; 2,133,016, Brantley, October 11, 1938; and 2,489,449, Crookston, November 29, 1949. An arrangement for actuating a valve which may be used for automatic control is shown in Fig. 4.

In Fig. 4 parts corresponding to like parts of Fig. 3 are identified with corresponding reference numbers. In Fig. 4, valve assembly O may be of the type suitable for connecting to automatic control means for actuating brakes. Since valves suitable for this purpose are disclosed in detail in the patents directed to automatic control 1,837,439 and 2,489,449, the details thereof are not shown in the present application.

Valve O is actuated by motor means P. Motor means P consists of a housing Q having sections 111, 112, 113, 114, and 115. End section 111 is secured to section 112 by cap screws 116 and similarly end section 115 is secured to section 114 by cap screws 117. The central sections 112, 113 and 114 are secured together by machine screws 118. Diaphragms 119 and 120 are arranged within the housing with their outer edges clamped in an air-tight manner between members 112, 113 and 113, 114, respectively. Arranged within the housing Q is a movable assembly R consisting of circular member 121, rod 122 provided with circular shoulder 123 and threaded to receive nut 124, and washers 125 and 126. Diaphragms 119 and 120 are provided with central openings and their inner edges are clamped in a fluid-tight manner to circular member 121 by washer 125 which is in contact with circular shoulder 123 of rod 122 and washer 126 is in contact with nut 124. The right hand end of rod 122, as shown in the drawing, is secured by bolt 127 to valve actuating rod 128 which passes through a circular opening in housing end member 115 and is packed off in a fluid-tight manner with packing 129. Thus the housing and the diaphragms define chambers 130 and 131. Access to chamber 130 is provided by fitting 132 screwed into a suitable threaded opening in end member 111 and similarly access to chamber 131 is provided by fitting 133 screwed into a suitable threaded opening in housing member 114.

Assembly R is biased to a central position in housing Q by spring 134 arranged between end member 111 and washer 126 and spring 135 arranged between end member 115 and washer 125.

In the embodiment of Fig. 4 compressed air is supplied through compressed air line K from a suitable supply of compressed air, such as an air compressor not shown in the drawing, and passes through branch line L to valve F of assembly A and through branch line M to large power means D. Compressed air also passes from compressed air line K through branch line S in which is mounted a hand set air regulator T. Branch line S is provided with a gauge U and is connected to fitting 132 of a motor means P. Valve F has its outlet connected through line 103 to manifold 104. Manifold 104 is connected to fitting 65 of small power means E to gauge 105 and to fitting 133 of motor means P.

In using the device of Fig. 4 the air regulator T is adjusted by hand until the gauge U reads the amount of weight which the automatic drilling control is to allow to be carried on the drilling bit. The hand regulated valve N is adjusted in the same way as described in reference to Fig. 3. That is to say, with all of the weight of the drill pipe suspended from the drilling line the valve N is operated until the reading of gauge 105 is zero, which takes place when the valve F of assembly A is moved to its full open position by actuation of actuating assembly G. However, in the assembly of Fig. 4, as the drill bit is lowered until part of the weight of the drill stem rests thereon any changes in the compressed air pressure as brought about by actuation of valve F causes the compressed air pressure in chamber 131 of motor means P to be changed and inasmuch as the compressed air pressure in the opposing chamber 130 is constant as long as the setting of valve T remains constant these variations in the compressed air pressure in chamber 131 cause movement of actuating rod 129 with corresponding movement of valve O which, as previously described, controls suitable automatic drilling equipment.

While I have disclosed specific embodiments of the present invention, it will be obvious that various changes in the sizes, shapes and proportions of the several parts may be made without departing from the scope of the invention.

What I desire to claim is:

1. A clamp for a live line weight indicator comprising a first and second part pivoted together, first and second guide means on the first part and a third guide means on the second part, said guide means cooperating to engage with the wire line and bend it into a bight, a first fluid operated power means which exerts a bias when fluid pressure is imposed upon a pressure subject area thereof operatively connecting said first and second parts, a second fluid operated power means which exerts a bias in response to fluid pressure imposed upon a pressure subject area, said second power means being similar to said first power means but having its said pressure subject area a multiple of said pressure subject area of said first power means operatively connecting said first and second parts, said first and second power means being arranged to force said guide means into contact with said wire line to bend said bight into a predetermined angle, a valve mounted in said assembly in fluid communication with said first power means and a contact member mechanically connected to the valve whereby a change in the angle of the bight of said wire line changes the setting of said valve.

2. A device in accordance with claim 1 in which an air conduit adapted to be connected to a source of compressed air at substantially constant pressure is directly connected to the inlet of said valve and in which said conduit is connected through a hand set air regulator to said second fluid operated power means.

3. A clamp for a wire line consisting of a first frame member and a second frame member pivoted to said first frame member, a pair of pulleys mounted on the first frame member, a pulley mounted on the second frame member, said pulley cooperating to engage with a wire line to force it into a bight with a predetermined angle, a first fluid operated power means which exerts a bias in response to fluid pressure imposed on a pressure subject area thereof operatively connecting the two frame members for changing the positions of said members, a second fluid operated power means which exerts a bias in response to fluid pressure imposed on a pressure subject area, said second power means being similar to said first power means but having a pressure subject area which is a multiple of the pressure subject area of said first power means operatively connecting the two frame members for changing the positions of said members, said power means thereby being capable of altering the angle of the bight engaged by said pulleys, a valve, means fluidly connecting the outlet of said valve with the first power means for supplying power thereto, and a contact member connected to said valve for changing the setting of said valve as a function of the changes in the positions of said two frame members.

4. A device in accordance with claim 3 in which an air conduit adapted to be connected to a source of compressed air at substantially constant pressure is directly connected to the inlet of said valve and in which said conduit is connected through a hand set air regulator to said second power means.

ARTHUR L. SELJOS.

References Cited in the file of this patent

UNITED STATES PATENTS

| Number | Name | Date |
|---|---|---|
| 2,121,870 | Greene | June 28, 1938 |
| 2,327,505 | Conrad et al. | Aug. 24, 1943 |

FOREIGN PATENTS

| Number | Country | Date |
|---|---|---|
| 705,751 | France | June 12, 1931 |